(12) United States Patent
Russo

(10) Patent No.: US 9,600,709 B2
(45) Date of Patent: Mar. 21, 2017

(54) METHODS AND SYSTEMS FOR ENROLLING BIOMETRIC DATA

(71) Applicant: Synaptics Incorporated, San Jose, CA (US)

(72) Inventor: Anthony P. Russo, New York, NY (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 13/759,852

(22) Filed: Feb. 5, 2013

(65) Prior Publication Data

US 2013/0272586 A1  Oct. 17, 2013

Related U.S. Application Data

(60) Provisional application No. 61/616,529, filed on Mar. 28, 2012.

(51) Int. Cl.
| | |
|---|---|
| *G06K 9/00* | (2006.01) |
| *G06F 21/32* | (2013.01) |
| *G06F 21/62* | (2013.01) |
| *G06F 21/82* | (2013.01) |
| *H04L 29/06* | (2006.01) |

(52) U.S. Cl.
CPC ......... *G06K 9/00087* (2013.01); *G06F 21/32* (2013.01); *G06F 21/6272* (2013.01); *G06F 21/82* (2013.01); *G06K 9/00006* (2013.01); *G06K 9/00926* (2013.01); *H04L 63/0861* (2013.01); *G06F 2221/2101* (2013.01)

(58) Field of Classification Search
CPC ........... G06K 9/00026; G06K 9/00087; G06K 9/00006; G06F 21/32; G06F 21/6272; G06F 21/82; G06F 2221/2101; H04L 63/0861
USPC ........................... 382/125, 124, 115; 340/5.2
See application file for complete search history.

(56) References Cited

U.S. PATENT DOCUMENTS

| | | |
|---|---|---|
| 4,151,512 A | 4/1979 | Rigannati et al. |
| 4,225,850 A | 9/1980 | Chang et al. |
| 4,310,827 A | 1/1982 | Asi |
| 4,353,056 A | 10/1982 | Tsikos |
| 4,405,829 A | 9/1983 | Rivest et al. |
| 4,525,859 A | 6/1985 | Bowles et al. |

(Continued)

FOREIGN PATENT DOCUMENTS

| | | |
|---|---|---|
| DE | 2213813 A1 | 10/1973 |
| EP | 0929028 A2 | 1/1998 |

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Bhavesh Mehta
*Assistant Examiner* — Ian Lemieux
(74) *Attorney, Agent, or Firm* — Leydig, Voit & Mayer, LTD

(57) ABSTRACT

Methods and systems for enrolling biometric data that is easier to use and provides a more positive end user experience. Additionally, machine readable medium storing instructions configurable to achieve the results when executed by a computing device are also provided.

20 Claims, 8 Drawing Sheets

(56) References Cited

U.S. PATENT DOCUMENTS

| | | | |
|---|---|---|---|
| 4,550,221 A | 10/1985 | Mabusth |
| 4,580,790 A | 4/1986 | Doose |
| 4,582,985 A | 4/1986 | Lofberg |
| 4,675,544 A | 6/1987 | Shrenk |
| 4,758,622 A | 7/1988 | Gosselin |
| 4,784,484 A | 11/1988 | Jensen |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hau et al. |
| 5,305,017 A | 4/1994 | Gerpheide |
| 5,319,323 A | 6/1994 | Fong |
| 5,325,442 A | 6/1994 | Knapp |
| 5,359,243 A | 10/1994 | Norman |
| 5,420,936 A | 5/1995 | Fitzpatrick et al. |
| 5,422,807 A | 6/1995 | Mitra et al. |
| 5,429,006 A | 7/1995 | Tamori |
| 5,456,256 A | 10/1995 | Schneider et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,848,176 A | 12/1998 | Harra et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A * | 8/1999 | Setlak et al. | 382/124 |
| 5,963,679 A | 10/1999 | Setlak |
| 5,995,630 A | 11/1999 | Borza |
| 5,999,637 A | 12/1999 | Toyoda et al. |
| 6,002,815 A | 12/1999 | Immega et al. |
| 6,011,859 A | 1/2000 | Kalnitsky et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,282,303 B1 * | 8/2001 | Brownlee | 382/124 |
| 6,289,114 B1 | 9/2001 | Mainguet |
| 6,292,272 B1 | 9/2001 | Okauchi et al. |
| 6,317,508 B1 | 11/2001 | Kramer et al. |
| 6,320,394 B1 | 11/2001 | Tartagni |
| 6,325,285 B1 | 12/2001 | Baratelli |
| 6,327,376 B1 | 12/2001 | Harkin |
| 6,332,193 B1 | 12/2001 | Glass et al. |
| 6,333,989 B1 | 12/2001 | Borza |
| 6,337,919 B1 | 1/2002 | Duton |
| 6,343,162 B1 | 1/2002 | Saito et al. |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 * | 6/2002 | Senior | 382/124 |
| 6,408,087 B1 | 6/2002 | Kramer |
| 6,459,804 B2 | 10/2002 | Mainguet |
| 6,473,072 B1 | 10/2002 | Comiskey et al. |
| 6,509,501 B2 | 1/2003 | Eicken et al. |
| 6,525,547 B2 | 2/2003 | Hayes |
| 6,525,932 B1 | 2/2003 | Ohnishi et al. |
| 6,539,101 B1 | 3/2003 | Black |
| 6,546,122 B1 * | 4/2003 | Russo | 382/125 |
| 6,580,816 B2 | 6/2003 | Kramer et al. |
| 6,597,289 B2 | 7/2003 | Sabatini |
| 6,628,812 B1 | 9/2003 | Setlak et al. |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,461 B2 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 * | 7/2004 | Catalano et al. | 382/115 |
| 6,785,407 B1 | 8/2004 | Tschudi et al. |
| 6,799,275 B1 | 9/2004 | Bjorn et al. |
| 6,836,230 B2 | 12/2004 | Le Pailleur et al. |
| 6,838,905 B1 | 1/2005 | Doyle |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,574 B2 | 9/2006 | Haruki et al. |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,184,581 B2 | 2/2007 | Johansen et al. |
| 7,190,209 B2 | 3/2007 | Kang et al. |
| 7,190,816 B2 | 3/2007 | Mitsuyu et al. |
| 7,194,392 B2 | 3/2007 | Tuken et al. |
| 7,197,168 B2 * | 3/2007 | Russo | 382/125 |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |

(56) References Cited

U.S. PATENT DOCUMENTS

| | | |
|---|---|---|
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,408,135 B2 | 8/2008 | Fujeda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,474,772 B2 | 1/2009 | Russo et al. |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,599,530 B2 | 10/2009 | Boshra |
| 7,616,787 B2 | 11/2009 | Boshra |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,826,645 B1 | 11/2010 | Cayen |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,059,872 B2 | 11/2011 | Tazoe |
| 8,063,734 B2 | 11/2011 | Conforti |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satya et al. |
| 8,224,044 B2 | 7/2012 | Benkley |
| 8,229,184 B2 | 7/2012 | Benkley |
| 8,276,816 B2 | 10/2012 | Gardner |
| 8,278,946 B2 | 10/2012 | Thompson |
| 8,290,150 B2 | 10/2012 | Erhart et al. |
| 8,315,444 B2 | 11/2012 | Gardner |
| 8,331,096 B2 | 12/2012 | Garcia |
| 8,358,097 B2 | 1/2013 | Cartwright |
| 8,358,815 B2 | 1/2013 | Benkley et al. |
| 8,374,407 B2 | 2/2013 | Benkley et al. |
| 8,391,568 B2 | 3/2013 | Satyan |
| 8,594,393 B2 | 11/2013 | Russo |
| 8,600,122 B2 | 12/2013 | Dean et al. |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hoffmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |

(56) References Cited

U.S. PATENT DOCUMENTS

| | | |
|---|---|---|
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0181521 A1 | 8/2006 | Perrault et al. |
| 2006/0182319 A1 | 8/2006 | Setlank et al. |
| 2006/0187200 A1 | 8/2006 | Martin |
| 2006/0202797 A1* | 9/2006 | Theis et al. ............. 340/5.52 |
| 2006/0210082 A1 | 9/2006 | Devadas et al. |
| 2006/0214512 A1 | 9/2006 | Iwata |
| 2006/0214767 A1 | 9/2006 | Carrieri |
| 2006/0222210 A1 | 10/2006 | Sundaram |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0177773 A1* | 8/2007 | Hu .................... G06K 9/6255 382/119 |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0290124 A1 | 12/2007 | Neil et al. |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0089563 A1* | 4/2008 | Yumoto ............. G06K 9/00087 382/124 |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175445 A1* | 7/2008 | Hu et al. ................. 382/118 |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0046812 A1* | 2/2010 | Maurer et al. ............. 382/125 |
| 2010/0083000 A1 | 4/2010 | Kesanupalli et al. |
| 2010/0117794 A1 | 5/2010 | Adams et al. |
| 2010/0119124 A1 | 5/2010 | Satyan |
| 2010/0123675 A1 | 5/2010 | Ippel |
| 2010/0127366 A1 | 5/2010 | Bond et al. |
| 2010/0135542 A1* | 6/2010 | Keepper, Jr. ........... G06K 9/036 382/124 |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0083018 A1 | 4/2011 | Kesanupalli et al. |
| 2011/0083170 A1 | 4/2011 | Kesanupalli et al. |
| 2011/0090047 A1 | 4/2011 | Patel |
| 2011/0102567 A1 | 5/2011 | Erhart |
| 2011/0102569 A1 | 5/2011 | Erhart |
| 2011/0148576 A1* | 6/2011 | Gupta .................... 340/5.83 |
| 2011/0157347 A1* | 6/2011 | Kalocsai .............. H04N 7/183 348/78 |
| 2011/0175703 A1 | 7/2011 | Benkley |
| 2011/0176037 A1 | 7/2011 | Benkley |
| 2011/0182486 A1 | 7/2011 | Valfridsson et al. |
| 2011/0214924 A1 | 9/2011 | Perezselsky et al. |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0016798 A1 | 1/2012 | Carper |
| 2012/0044639 A1 | 2/2012 | Garcia |
| 2012/0189166 A1 | 7/2012 | Russo |
| 2012/0189172 A1 | 7/2012 | Russo |
| 2012/0206586 A1 | 8/2012 | Gardner |
| 2012/0256280 A1 | 10/2012 | Ehart |
| 2012/0257032 A1 | 10/2012 | Benkley |
| 2012/0308092 A1 | 12/2012 | Benkley et al. |
| 2013/0021044 A1 | 1/2013 | Thompson et al. |

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| GB | 2487661 A1 | 8/2012 |
| GB | 2489100 A | 9/2012 |
| GB | 2490192 | 10/2012 |

(56) References Cited

FOREIGN PATENT DOCUMENTS

| | | | |
|---|---|---|---|
| GB | 2474999 B | 2/2013 | |
| GB | 2502418 A | 11/2013 | |
| JP | 01094418 A2 | 4/1989 | |
| JP | 04158434 A2 | 6/1992 | |
| JP | 08263658 A | 10/1996 | |
| JP | 2000165378 A | 6/2000 | |
| JP | 2005011002 A | 1/2005 | |
| JP | 2005242856 | 9/2005 | |
| JP | 2007305097 A | 11/2007 | |
| TW | 200606745 A | 2/2006 | |
| TW | 200606746 | 2/2006 | |
| TW | 200614092 | 5/2006 | |
| TW | 200617798 | 6/2006 | |
| TW | 200620140 A | 6/2006 | |
| TW | 200629167 A | 8/2006 | |
| WO | WO 90/03620 A1 | 4/1990 | |
| WO | WO 98/58342 A1 | 12/1998 | |
| WO | WO 99/28701 A1 | 6/1999 | |
| WO | WO 99/43258 A1 | 9/1999 | |
| WO | WO 01/22349 A1 | 3/2001 | |
| WO | WO 01/94902 A2 | 12/2001 | |
| WO | WO 01/94902 A3 | 12/2001 | |
| WO | WO 01/95304 A1 | 12/2001 | |
| WO | WO 02/11066 A1 | 2/2002 | |
| WO | WO 02/47018 A2 | 6/2002 | |
| WO | WO 02/47018 A3 | 6/2002 | |
| WO | WO 02/061668 A1 | 8/2002 | |
| WO | WO 02/077907 A1 | 10/2002 | |
| WO | WO 03/063054 A2 | 7/2003 | |
| WO | WO 03/075210 A2 | 9/2003 | |
| WO | WO 2004/066194 A1 | 8/2004 | |
| WO | WO 2004/066693 A1 | 8/2004 | |
| WO | WO 2005/104012 A1 | 11/2005 | |
| WO | WO 2005/106774 A2 | 11/2005 | |
| WO | WO 2005/106774 A3 | 11/2005 | |
| WO | WO 2006/040724 A1 | 4/2006 | |
| WO | WO 2006/041780 A1 | 4/2006 | |
| WO | WO 2007/011607 A1 | 1/2007 | |
| WO | WO 2008/033264 A2 | 3/2008 | |
| WO | WO 2008/033264 A3 | 3/2008 | |
| WO | WO 2008/033265 A2 | 6/2008 | |
| WO | WO 2008/033265 A3 | 6/2008 | |
| WO | WO 2008/137287 A1 | 11/2008 | |
| WO | WO 2009/002599 A2 | 12/2008 | |
| WO | WO 2009/002599 A3 | 12/2008 | |
| WO | WO 2009/029257 A1 | 6/2009 | |
| WO | WO 2009/079219 A1 | 6/2009 | |
| WO | WO 2009/079221 A2 | 6/2009 | |
| WO | WO 2009/079262 A1 | 6/2009 | |
| WO | WO 2010/034036 A1 | 3/2010 | |
| WO | WO 2010/036445 A1 | 4/2010 | |
| WO | WO 2010/143597 A1 | 12/2010 | |
| WO | WO 2011/088248 A1 | 1/2011 | |
| WO | WO/2011/088252 A1 | 1/2011 | |
| WO | WO 2011/053797 A1 | 5/2011 | |

OTHER PUBLICATIONS

Maltoni, "Handbook of Fingerprint Recognition", XP002355942 Springer, New York, USA, Jun. 2003 (Jun. 2003) pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006 (Mar. 1, 2006), pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008 (May 31, 2008), pp. 1-149, XP002630374, Retrieved from the Internet: URL:http://alexandria.tue.nl/extral/afstversl/wski/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

bellagiodesigns.com (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

http://en.wikipedia.org/wiki/IEEE_1394.

German Patent Office, Office Action for German Patent Application No. 10 2013 004 842.7 (Nov. 24, 2014).

* cited by examiner

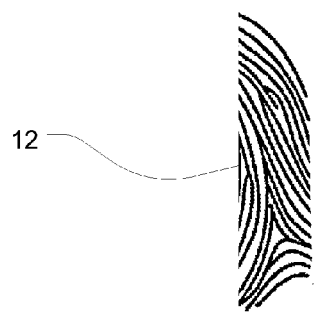
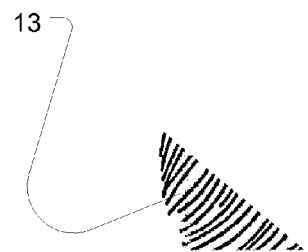
Fig. 3a  Fig. 3b
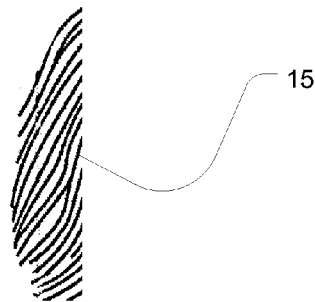
Fig. 3c  Fig. 3d
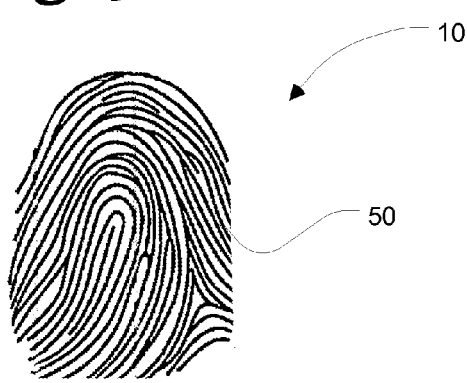
Fig. 3e  Fig. 3f

METHODS AND SYSTEMS FOR ENROLLING BIOMETRIC DATA

CROSS-REFERENCE

This application claims the benefit of U.S. Provisional Application No. 61/616,529, filed Mar. 28, 2012, entitled Methods and Systems for Enrolling Biometric Data, by Russo, which application is incorporated herein by reference.

BACKGROUND OF THE INVENTION

Personal verification systems utilize a variety of systems and methods to protect information and property and to authenticate authorized users. Some protection systems rely on information acquired by biometric sensors relating to the biometric features of a user's body. The use of biometric information for authentication is advantageous, because each biometric feature is unique to the user. Any biometric feature can be used, including facial features, a retinal image, palm print, fingerprint, or signature. Where the biometric feature is a fingerprint, the biometric sensor obtains information representative of the user's fingerprint.

U.S. Pat. No. 7,599,530 issued Oct. 6, 2009 for "Method for Matching Ridge Orientation;" describes methods for processing finger biometric data; U.S. Pat. No. 7,616,787 issued Nov. 10, 2009, for "Methods for Finger Biometric Processing and Associated Finger Biometric Sensors;" describes methods for fingerprint biometric processing that include scoring information for spot properties. Additionally, U.S. Pat. Nos. 6,289,114 and 6,459,804 to Mainguet describe a method for image reconstruction from slices obtained using a thermal slide sensor. In this work, image slices are stitched together to form a fingerprint image. Stitching is based on alignment of consecutive slices using correlation. U.S. Pat. No. 7,197,168 to Russo describes methods and systems for biometric image assembly from multiple partial biometric frame scans. Published U.S. Patent Application US2003/0123714 A1 to O'Gorman et al. discloses another approach for image reconstruction. In O'Gorman, the sequence of images provided by the slide sensor is processed to generate an image of the fingerprint. However, only a subset of the image, which they define as a slice, is used in the reconstruction. This sub-image has the same number of columns as the original image but fewer rows. Correlation is based on a sub-image of the slice, which is referred to as a frame. This sub-image has the same number of columns as the sensor but fewer rows than the slice. A frame in a slice is correlated with similar frames in an adjacent slice to determine the extent of overlap between them.

A common feature of user enrollment processes employed with biometric sensing is that the end user is aware of the enrollment process and must cooperate with it. The enrollment process itself can be a significant impediment to acceptance of biometric technology, because users must first locate and execute the enrollment application, then successfully enroll their fingers before the technology can be used for future authentication. For many users this is too cumbersome.

There is a need, therefore, for methods and systems for enrolling biometric data that are easier to use and provide a more positive user experience.

SUMMARY OF THE INVENTION

Methods and systems for enrolling biometric data that is easier to use and provides a more positive end user experience. Additionally, machine readable medium storing instructions configurable to achieve the results when executed by a computing device are also provided.

An aspect of the disclosure is directed to a tangible machine readable medium storing instructions that, when executed by a computing device, cause the computing device to perform a method of compiling a record. The methods comprising: obtaining a first fingerprint view at a first time without prompting a user to position a finger for sensing; creating a single record containing the obtained fingerprint view; and determining whether the record of the obtained fingerprint view reaches a target threshold value. Additionally, one or more subsequent fingerprint views can be obtained at one or more subsequent times without prompting a user and then added to the record that is initially created. In some instances, one or more subsequent fingerprint views at one or more subsequent times are added to the record after the step of determining whether the record of the obtained fingerprint view reaches a threshold value when the threshold value is not achieved. Thereafter, a fingerprint enrollment interface can be presented to a user after the step of determining whether the record of the obtained fingerprint view reaches a threshold value when the threshold value is achieved. In some instances, the fingerprint enrollment interface is presented to the user automatically, while in other instances, the fingerprint enrollment interface is presented and semi-automatically. In still other aspects, the one or more subsequent fingerprint views can be added to the record when all or a portion of the subsequent fingerprint view is not duplicative of the first fingerprint view or another view in the record. Additionally one or more subsequent fingerprint views can be deleted, either before or after adding to a record, when the subsequent fingerprint view is duplicative of the fingerprint views in the record. In some cases, the target threshold value is determined by at least one of a user, an administrator and a network provider. Thus, for example, in cases where a user requires a high degree of authenticity, the threshold value can be set high. Additionally, the process of compiling a record is concludable when one or more process is completed: (1) a target amount of an area of a finger is collected, (2) a threshold number of views are collected; (3) a threshold amount of time has passed; and (4) consistent fingerprint information is no longer sensed.

Another aspect of the disclosure is directed to a method of fingerprint enrollment comprising: obtaining a first fingerprint view at a first time without prompting a user to position a finger for sensing; creating a single record containing the obtained fingerprint view; and determining whether the record of the obtained fingerprint view reaches a target threshold value. Additionally, one or more subsequent fingerprint views can be obtained at one or more subsequent times without prompting a user and then added to the record that is initially created. In some instances, one or more subsequent fingerprint views at one or more subsequent times are added to the record after the step of determining whether the record of the obtained fingerprint view reaches a threshold value when the threshold value is not achieved. Thereafter, a fingerprint enrollment interface can be presented to a user after the step of determining whether the record of the obtained fingerprint view reaches a threshold value when the threshold value is achieved. In some instances, the fingerprint enrollment interface is presented to the user automatically, while in other instances, the fingerprint enrollment interface is presented and semi-automatically. In still other aspects, the one or more subsequent fingerprint views can be added to the record when all or a portion of the subsequent fingerprint view is not duplicative of the first fingerprint view or another view in the record. Additionally one or more subsequent fingerprint views can be deleted, either before or after adding to a record, when the subsequent fingerprint view is duplicative of the fingerprint views in the record. In some cases, the target threshold value is determined by at least one of a user, an administrator and a network provider. Thus, for example, in cases where a user requires a high degree of authenticity, the threshold value can be set high. Additionally, the process of compiling a record is concludable when one or more process is completed: (1) a target amount of an area of a finger is collected, (2) a threshold number of views are collected; (3) a threshold amount of time has passed; and (4) consistent fingerprint information is no longer sensed.

Still another aspect of the disclosure is directed to methods of authenticating a user. The methods comprise: obtaining a fingerprint input for authentication; comparing the fingerprint input for authentication to a template wherein the template is a single record having one or more fingerprint views obtained from a user during an enrollment process without prompting the user to position a finger for sensing to determine whether the fingerprint input achieves a threshold match of the template; if the comparison reaches the threshold match, affirming the authenticity of the fingerprint input, if the comparison does not reach a threshold match, disallowing the authenticity of the fingerprint input. Additionally, affirming the authenticity of the fingerprint input enables one or more of user authentication for a device, user authentication for an online transaction, user authentication for access to systems and services, user ability to replace a password or a PIN, physical access to a secured location, determination of time attendance, navigation of an electronic device touch screen, and non-repudiation for online transactions.

Yet another aspect of the disclosure is directed to a tangible machine readable medium storing instructions that, when executed by a computing device, cause the computing device to authenticate a user. This process comprises: obtaining a fingerprint input for authentication; comparing the fingerprint input for authentication to a template wherein the template is a single record having one or more fingerprint views obtained from a user during an enrollment process without prompting the user to position a finger for sensing to determine whether the fingerprint input achieves a threshold match of the template; if the comparison reaches the threshold match, affirming the authenticity of the fingerprint input, if the comparison does not reach a threshold match, disallowing the authenticity of the fingerprint input. Additionally, affirming the authenticity of the fingerprint input enables one or more of user authentication for a device, user authentication for an online transaction, user authentication for access to systems and services, user ability to replace a password or a PIN, physical access to a secured location, determination of time attendance, navigation of an electronic device touch screen, and non-repudiation for online transactions.

INCORPORATION BY REFERENCE

All publications, patents, and patent applications mentioned in this specification are herein incorporated by reference to the same extent as if each individual publication, patent, or patent application was specifically and individually indicated to be incorporated by reference.

Additional references of interest include, for example, U.S. Pat. No. 7,099,496 issued Aug. 29, 2006, to Benkley, for "Swiped Aperture Capacitive Fingerprint Sensing Systems and Methods;" U.S. Pat. No. 7,463,756 issued Dec. 9, 2008, to Benkley for "Finger Position Sensing Methods and Apparatus;" U.S. Pat. No. 7,751,601 issued Jul. 6, 2010, to Benkley for "Finger Sensing Assemblies and Methods of Making;" U.S. Pat. No. 7,460,697 issued Dec. 2, 2008 to Erhart for "Electronic Fingerprint Sensor with Differential Noise Cancellation;" U.S. Pat. No. 7,953,258 issued May 31, 2011, to Dean et al. for "Fingerprint Sensing Circuit Having Programmable Sensing Patterns;" and U.S. Pat. No. 6,941,001 issued Sep. 6, 2005, to Bolle for "Combined Fingerprint Acquisition and Control Device."

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 3A-F illustrate an examples of portions of a fingerprint captured at various times and compiled into a complete fingerprint suitable for enrollment;

DETAILED DESCRIPTION OF THE INVENTION

I. Devices

Figure 1A:
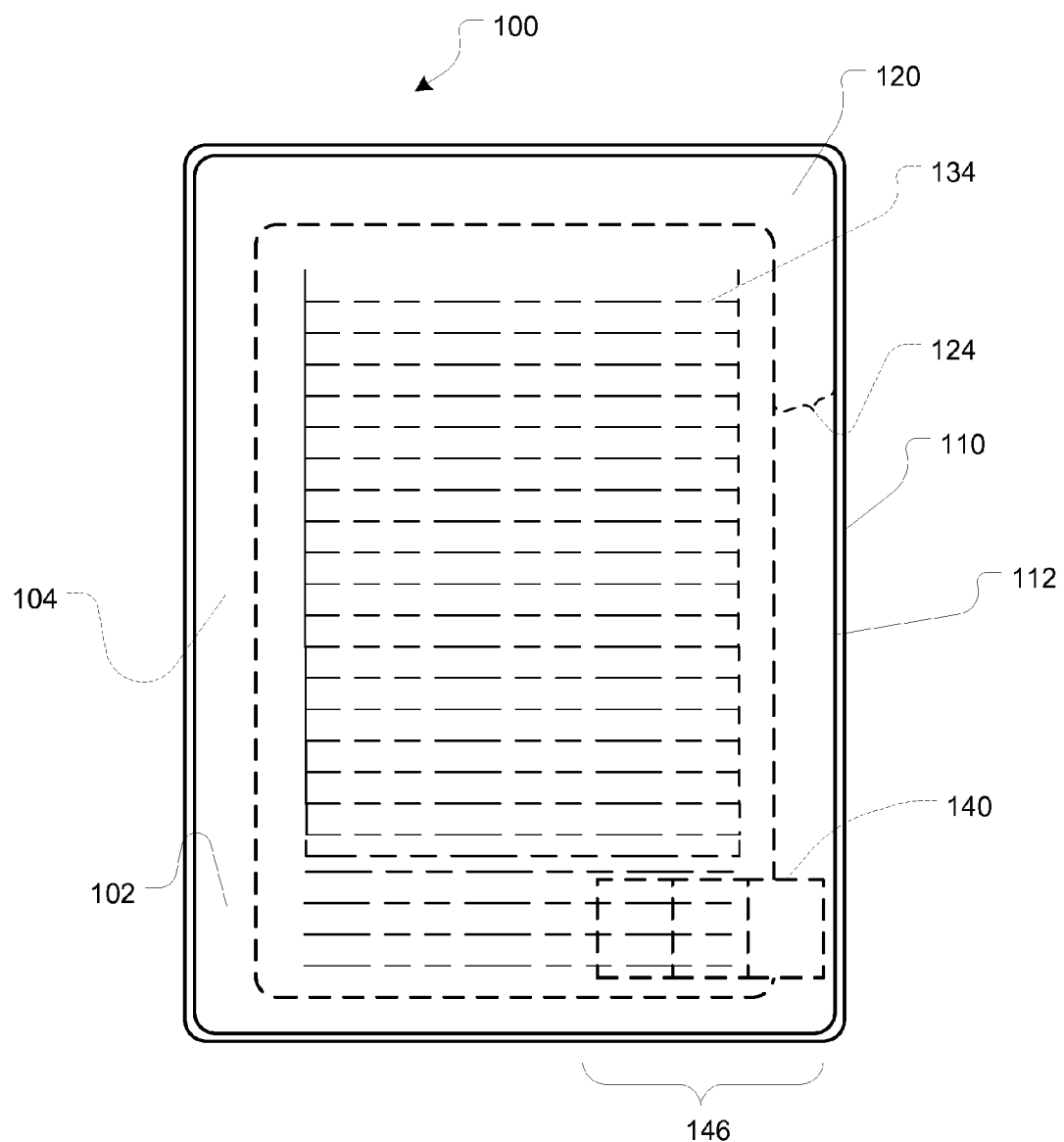
FIGS. 1A-D are top views of an electronic devices having a display.

A variety of electronic displays are used with electronic devices. Displays can operate using either emissive (pixels generate light), transmissive (light transmitted through pixels) and reflective (ambient light reflected) approaches. Display types may include, for example, liquid crystal displays (LCDs) which use liquid crystal cells that change transmission, or reflection in an applied electric field, organic light emitting diode (OLED) devices which utilize a light emitting diode (LED) in which an emissive electroluminescent film of organic compounds emits light in response to an electric current, and different types of electrophoretic displays in which pigmented particles are moved in response to an electric field (e.g. Gyricon, E-ink, etc.). Gyricon is a type of electronic paper developed at Xerox PARC and is a thin layer of transparent plastic in which millions of small beads are randomly disposed. The beads, somewhat line toner particles, are each contained an oil-filled cavity and are free to rotate within those cavities. The beads are bichromal with hemispheres of two contrasting colors and charged such that they exhibit an electrical dipole. When voltage is applied to the surface of the sheet, the beeds rotate to present one of the two colors to the viewer. Thus voltages can be applied to create images such as text and pictures. E-ink is another type of electronic paper manufactured by E Ink Corporation which was acquired by Prime View International.

The LCD panel typically consists of two sheets of glass separated by a sealed-in liquid crystal material. Both sheets have a thin transparent coating of conducting material, with the viewing side etched into segments with leads going to the edge of the display. Voltages applied between the front and back coatings disrupt the orderly arrangement of the molecules sufficiently to darken the liquid and form visible patterns.

Additionally, displays have been developed that can detect the presence and location of touch, e.g., by a finger, or passive object such as a stylus or digital pen, are commonly referred to as a touch screens. Touch screens have become a component of many computer and electronic devices. Many LCD displays are manufactured to include touch screen functionality. Touch screens can be attached or incorporated into to computers, networks, mobile telephones, video games, personal digital assistants (PDA), tablets, or any digital device. A variety of technologies are currently used to produce a device with touch screen capabilities. Technologies that enable touch screen functionality include: resistive touch screen panels; surface acoustic wave technology; capacitive sensing panels (e.g., using surface capacitance technology or projective capacitive touch technology, which uses either mutual capacitive sensors or self-capacitive sensors); infrared; optical imaging; dispersive signal technology; and acoustic pulse recognition. Touch screen functionality can be combined with a display in a device in many configurations. The touch screen sensing circuits can be incorporated directly in or on the layers of the display (using, for example, "in-cell" or "on-cell" approaches), built on a separate substrate which is laminated onto the display (e.g., using an "out-cell" approach), or laminated on a cover lens which protects the display in the device, or the sensing circuits can be incorporated directly on the back-side of this cover lens ("Touch-on-Lens").

As will be appreciated by those skilled in the art, electronic devices can be configured to include a variety of components and features including: a display, a touch screen, a scratch-resistant cover (e.g., lens), storage, a system on a chip, a CPU core, a GPU core, memory, Wi-Fi connectivity (e.g., 902.11 b.g), Bluetooth, connectivity (e.g., USB connector), camera, audio, battery (e.g., built-in, rechargeable lithium-ion polymer battery), power connector, computer readable media, software, etc.

For purposes of illustrating the biometric enrollment process of the disclosure, a touch screen display currently employed by, for example, a smart phone is described. Such a touch screen typically comprises a 9 cm (3.5 in) liquid crystal display (LCD) with a scratch-resistant glass layer. The capacitive touch screen of the LCD is typically optimized for a bare finger, or multiple finger multi-touch, sensing. However, as will be appreciated by those skilled in the art, a variety displays as well as a variety of touch screen configurations and touch screen operated devices can be used without departing from the scope of the disclosure.

An LCD touch screen typically is an assembly that includes an LCD, a printed circuit board (PCB) on which input-output (I/O) connections and integrated circuits (ICs) performing various functions are mounted, a transparent touch screen circuit pattern on a transparent substrate, and a protective shield or coating applied on top of the touch screen circuitry. The touch screen circuitry is connected along with the LCD display to the PCB. The touch screen circuitry is typically incorporated into the assembly using one of two methods. In a first method, the touch screen circuitry is incorporated directly into or onto the LCD, then a protective shield or coating (e.g. cover lens) is located above the LCD/Touch screen combination. In a second method, the touch screen circuitry is applied onto the protective coating or shield (e.g. cover lens) and then the resulting structure is mounted above the LCD, with the touch screen circuitry mounted between the protective coating or shield and the LCD. In all cased the PCB is located below the LCD, out of view.

Biometric sensors can include, for example, a fingerprint sensor, a velocity sensor, and an integrated circuit which is electrically connected to the fingerprint sensor and the velocity sensor. Conductive traces of an image sensor and velocity sensor can be etched or otherwise formed on an upper side of a substrate. A protective coating can be applied to the upper surface of the substrate, over the image sensor and velocity sensor to provide electrical isolation and mechanical protection of the sensors. Alternatively, conductive traces of an image sensor can be formed on a bottom-side of a substrate, wherein the substrate can act as a protective coating and can be further improved with a hard coating applied to the upper surface. Further details about fingerprint sensor configurations are contained in, for example, U.S. Pat. No. 7,751,601 to Benkley III for "Fingerprint Sensing Assemblies and Methods of Making"; U.S. Pat. No. 7,099,496 to Benkley III for "Swiped Aperture Capacitive Fingerprint Sensing Systems and Methods;" U.S. Pat. No. 7,463,756 to Benkley III for "Finger Position Sensing Methods and Apparatus;" U.S. Pat. No. 7,460,697 to Erhart et al. for "Electronic Fingerprint Sensor with Differential Noise Cancellation;" U.S. Pat. No. 7,146,024 to Benkley III for "Swiped Aperture Capacitive Fingerprint Sensing Systems and Methods;" U.S. Pat. No. 6,400,836 to Senior for "Combined Fingerprint Acquisition and Control Device;" and U.S. Pat. No. 6,941,001 to Bolle for "Combined Fingerprint Acquisition and Control Device."

In some configurations, the sensing device could, in fact, be large enough to provide a usable fingerprint (e.g. having at least about a 6 mm×6 mm sensing area). In some cases, the image captured might be a small portion of the usable fingerprint. In other cases, a larger image will be captured. The goal of this enrollment procedure is to simply collect an enrollment without the user's knowledge or effort.

In the systems disclosed herein, a fingerprint sensor is integrated with a display and is positioned on or adjacent the uppermost surface such that the fingerprint sensor is within about 250 microns of a finger when the finger comes in contact with the uppermost surface of the system. In at least some configurations, the system can be configured such that the finger sensor is within about 100 microns of a finger, or more preferably within 50 microns of a finger, when the finger comes in contact with the uppermost surface of the system. In some configurations, a single chip can be provided that controls one or more of the display, touch screen and the fingerprint sensing functions. Additionally, the fingerprint sensor can be incorporated in such a way that the surface of the device presented to a user is smooth or substantially smooth. Displays and systems can be configured such that they are integrally formed such that they act in a unified manner or such that the completed display or system is comprised of a single component.

For purposes of illustration, FIG. 1A is provided which is an electronic device 100 from a top or upper surface view. The device is any suitable electronic device, such as a smart phone, having a device or display interface 120 which a user engages with their finger. Depending upon the nature of the device and display used, the interface 120 can further be comprised of a plurality of parts, as discussed in further detail below. As will be appreciated by those skilled in the art, other the methods and systems disclosed can be incorporated in a wide variety of device form factors without departing from the scope of the disclosure.

The device itself has a top surface 102 and a bottom surface 104. Moreover, each component of the device has an upper surface (i.e. a surface that faces the top surface of the device) and a lower surface (i.e. a surface that faces the bottom surface of the device) as will be appreciated from the cross-sectional views. The housing 110 of the electronic device 100 can be configured to form a bezel or rim 112 which secures the interface 120 within the housing 110 of the device 100. A mask 124, such as an ink mask, can be provided which frames at least part of the interface 120. The mask 124 is typically positioned such that it obscures device electronics located within the housing under a portion of the interface 120. For a touch screen enabled interface, a portion of the interface 120 that is not covered by mask 124 has a plurality of touch screen sensors 134. The plurality of touch screen sensors 134 can be any suitable conductor, including a transparent conductor, for example, from a layer of patterned indium tin oxide (ITO), carbon nanotubes, metal nanowires, conductive polymers or fine metal lines (e.g., copper lines). Additionally, a fingerprint sensor 140 adjacent at least one wall of the electronic device 100 and can (as illustrated here), but need not, be positioned in a location where the mask 124 is also present. In another configuration, an aperture can be provided in the mask corresponding to all or part of a location where the fingerprint is sensed. The fingerprint sensor 140 can include a swiping or placement area 146 where, for example, a user would swipe their fingerprint or place their finger which is then read by the fingerprint sensor 140.

As shown in FIG. 1A the fingerprint sensor 140 is positionable such that it overlays a portion of the touch screen sensor 134. In some configurations, the sensors of the fingerprint sensor 140 and the touch screen sensor 134 are integrally formed such that the sensors are formed as one piece or are formed such that the sensors act in a unified manner with portions of the sensor adapted to function as a touch screen sensor and a subset adapted to function as a fingerprint sensor or a fingerprint sensor and a touch screen sensor. In other configurations, the fingerprint sensor 140 is integrated into, for example, an on/off button, or is positioned underneath a commonly used operational icon.

Figure 1B:
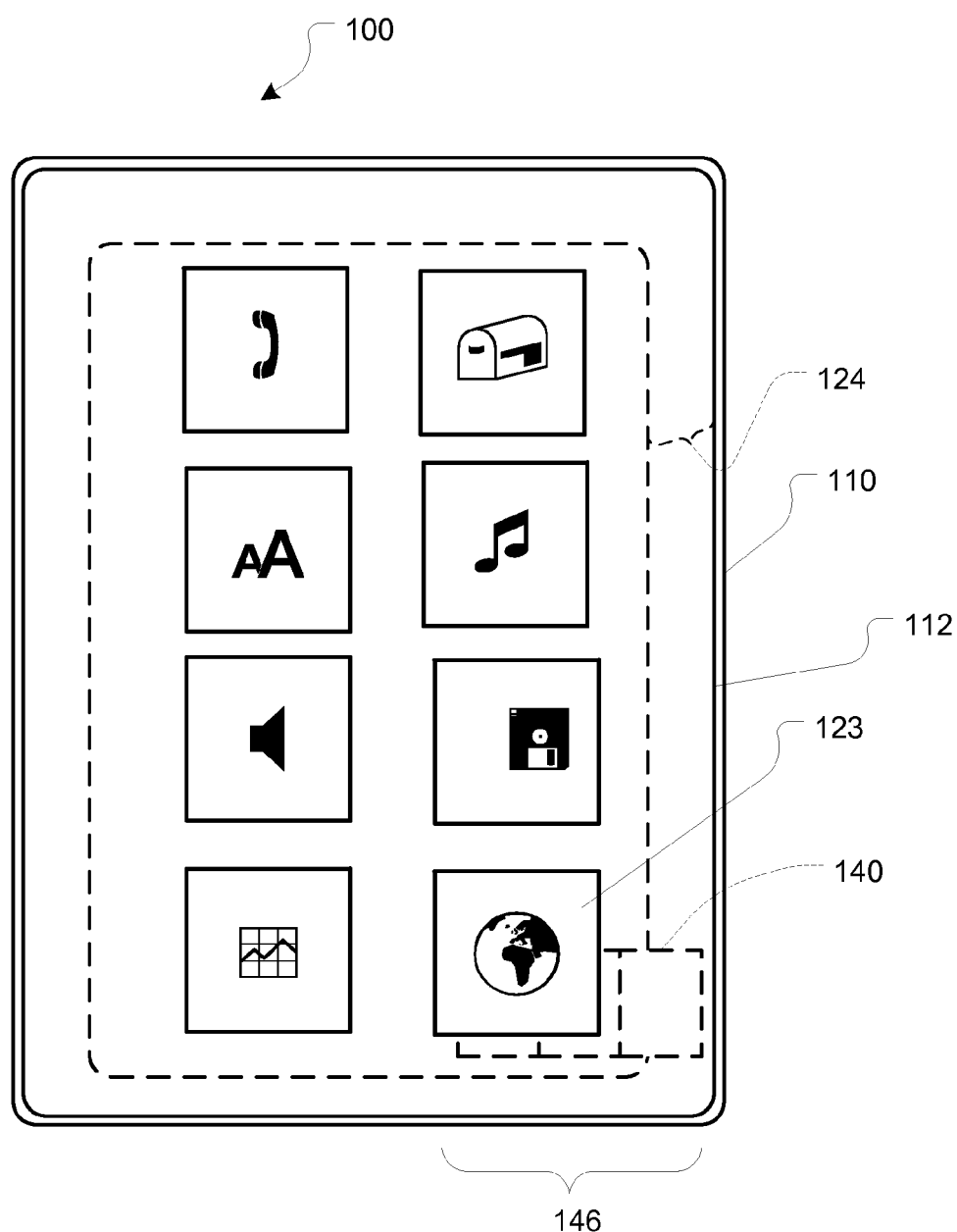
Figure 1C:
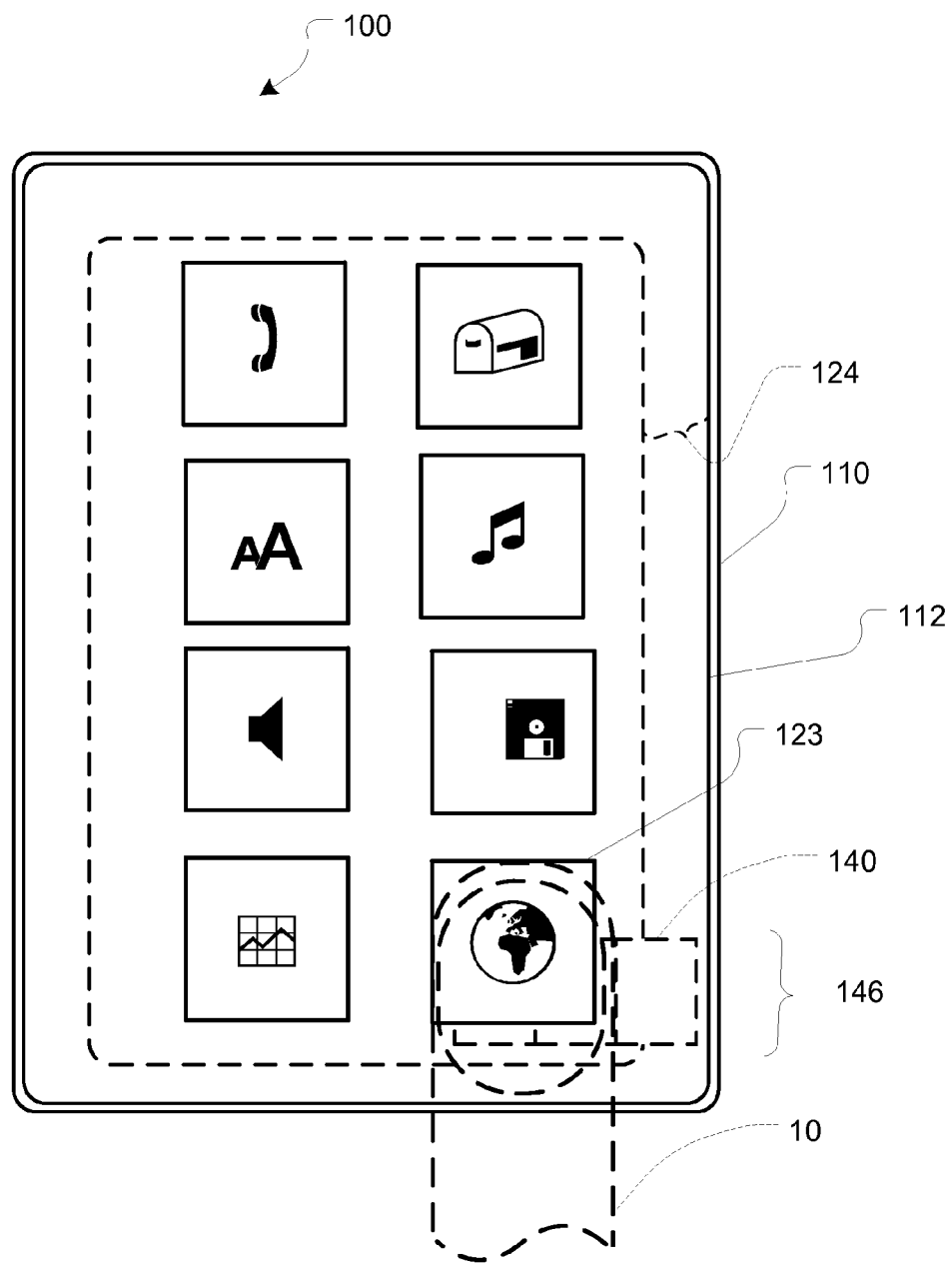
Figure 1D:
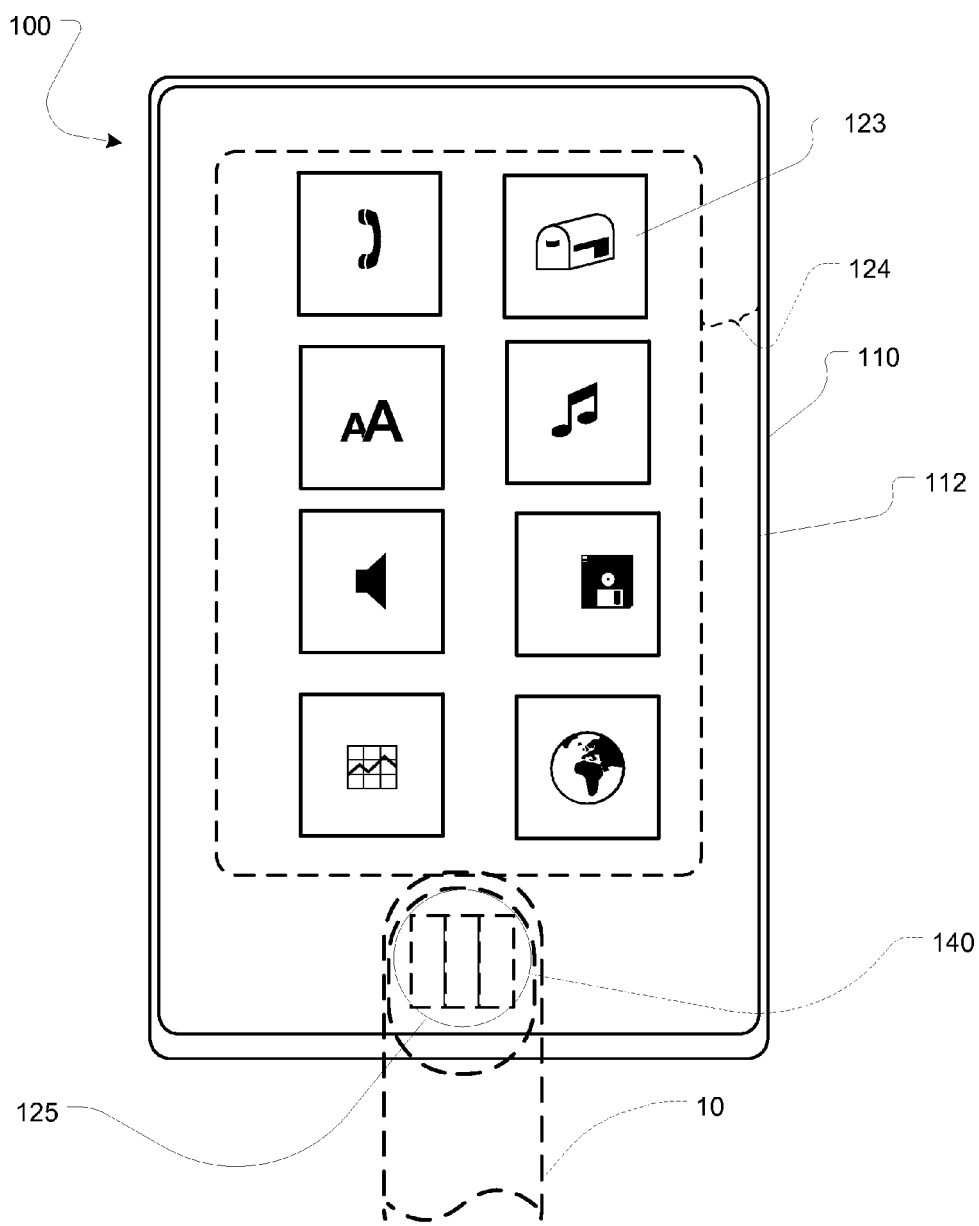

FIG. 1B illustrates an electronic device 100 having a housing 110 and a mask 124. One or more icons 123 are provided which enable a user to activate specific functionality (e.g., make a phone call, take a picture, access the internet, etc.). In one embodiment, the fingerprint sensor 140 is positionable such that it is underneath all or a part of an icon 123. FIG. 1C illustrates a finger 10 engaging the device 100 at an icon 123 and a fingerprint sensor 140 associated with a sensing area 146. FIG. 1D illustrates a finger 10 engaging an on/off button 125 of a device 100 having a fingerprint sensor 140 associated therewith.

Figure 2:
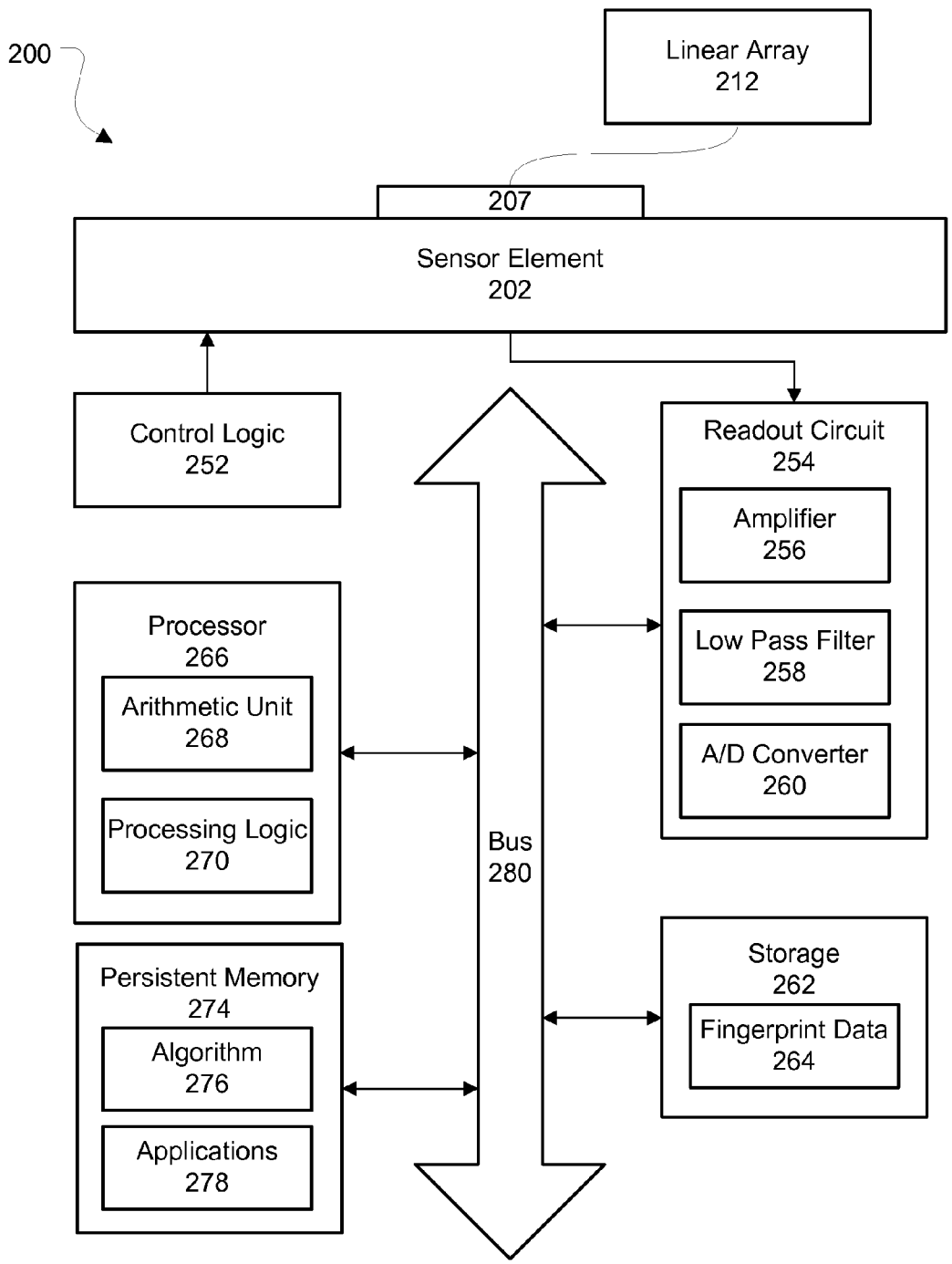
FIG. 2 illustrates a sensing device configured for use with a display device.

FIG. 2 illustrates a diagrammatic view of a sensing device 200 configured for use with a display device. The device 200 includes a linear array 212, and also includes a sensor element 202. The device further includes sensor control logic 252 configured to control the basic operations of the sensor element. The exact operations of the sensor element governed by the sensor logic control depends on a particular sensor configuration employed, which may include power control, reset control of the pixels or data contact points, output signal control, cooling control in the case of some optical sensors, and other basic controls of a sensor element. Sensor controls are well known by those skilled in the art, and, again, depend on the particular operation.

Sensing device 200 further includes a readout circuit 254 for reading analog output signals from sensor element 202 when it is subject to a fingerprint juxtaposed on a sensor surface 207. Readout circuit 254 includes an amplifier 256 configured to amplify the analog signal so that it can more accurately be read in subsequent operations. A low pass filter 258 is configured to filter out any noise from the analog signal so that the analog signal can be more efficiently processed. Readout circuit 254 further includes an analog-to-digital (A/D) converter 260 that is configured to convert the output signal from sensor element 202 to a digital signal that indicates a series of logic 0's and 1's that define the sensing of the fingerprint features by the pixels or data contact points of sensor surface 207. Such signals may be separately received by the motion sensors and the fingerprint sensing surfaces, and may be read out and processed separately.

Readout circuit 254 may store the output signal in a storage 262, where fingerprint data 264 is stored and preserved, either temporarily until a processor 266 can process the signal, or for later use by the processor. Processor 266 includes an arithmetic unit 268 configured to process algorithms used for navigation of a cursor, and for reconstruction of fingerprint images if necessary. Processing logic 270 is configured to process information and includes analog to digital converters, amplifiers, signal filters, logic gates (all not shown) and other logic utilized by a processor. A persistent memory 274 is used to store algorithms 276 and software applications 278 that are used by processor 266 for the various functions described above, and in more detail below. A system bus 280 is a data bus configured to enable communication among the various components contained in sensing device 200. As will be appreciated by those skilled in the art, memory and storage can be any suitable computer readable media.

The system further includes a controller communicating with the fingerprint sensor lines to capture a fingerprint image when, for example, a user's finger is swiped across the fingerprint sensor lines or when a finger placement is sensed by the sensor. Thus, the system is configurable to detect the presence of a finger or a fingerprint in one dimension (1D) and/or two dimensions (2D). In one system, there may be separate controllers for both the display and the fingerprint sensor, where the system is configured to include a display controller configured to control the visible display separate from the fingerprint sensor operations. Alternatively, a single controller may be used to control, for example, the visible display and the fingerprint sensor operations. The fingerprint sensor could also be patterned onto the top glass of the display itself, and not onto a touch-screen layer.

II. Fingerprint Enrollment Process

The systems and methods provided collect biometric data from a biometric sensor, such as a fingerprint sensor, and facilitates enrollment of a user in a way that that is easier for the end user to engage and provides a more positive user experience. Currently, a user is typically directed to, for example, swipe one or more fingers on the fingerprint sensor several times in order to enroll a baseline print or prints against which other attempts to access the device will be compared. If the user does not present the fingerprint in a manner that allows sufficient information to be extracted to facilitate the matching process, the user will be directed to attempt to enroll using the fingerprint sensor again. This process is repeated until the user successfully provides the fingerprint sensor with information that can be processed to create an enrollment. However, users can and often are frustrated by this process and may abandon the fingerprint enrollment process altogether, thereby losing the benefit of the added security the fingerprint sensor provides. In some cases, the mere need to locate and run an enrollment application may be too cumbersome a hurdle for users to overcome.

The methods and systems described herein do not require an end user to formally go through an enrollment process. Instead, as long as the biometric sensor is touched by a finger during normal operation of the device (e.g. mobile phone, tablet, laptop PC, etc.), the sensed data can be collected, evaluated and analyzed unbeknownst to the user. This collection, evaluation and analysis process is transparent to the user's interface with the device.

Additionally, the collected data, or a subset thereof, can be used to create an enrollment template without the user's knowledge, after which the user will be enrolled without having to go through any additional process or effort. The enrollment process can be automatic or semi-automatic. In one scenario, once the device collects, compiles, and analyzes enough data to identify a fingerprint profile, the next time the device senses that fingerprint on the device a pop-up screen can appear that allows the user to identify his or herself as, for example, a primary or secondary user of the device. The pop-up screen can, for example, appear pre-populated with the user information associated with the device and simply ask the user to confirm that they would like this fingerprint associated with the pre-populated user information. As will be appreciated by those skilled in the art, there is a minimum of features (i.e., minutiae points), that are extracted from the images before the image is processed. This can be dependent on the matcher used. However, less than 5 could be considered an insufficient amount of data upon which to base a match. The amount of an entire fingerprint that is compiled, can be based on a sliding scale. The more the fingerprint image obtained, the smaller the chance of a false reject occurring during authentication. Thus the goal of an enrollment algorithm is to capture as much of the fingerprint as reasonably possible within the time and system constraints. Once an initial enrollment has been completed additional information can be added using other techniques.

Figure 4:
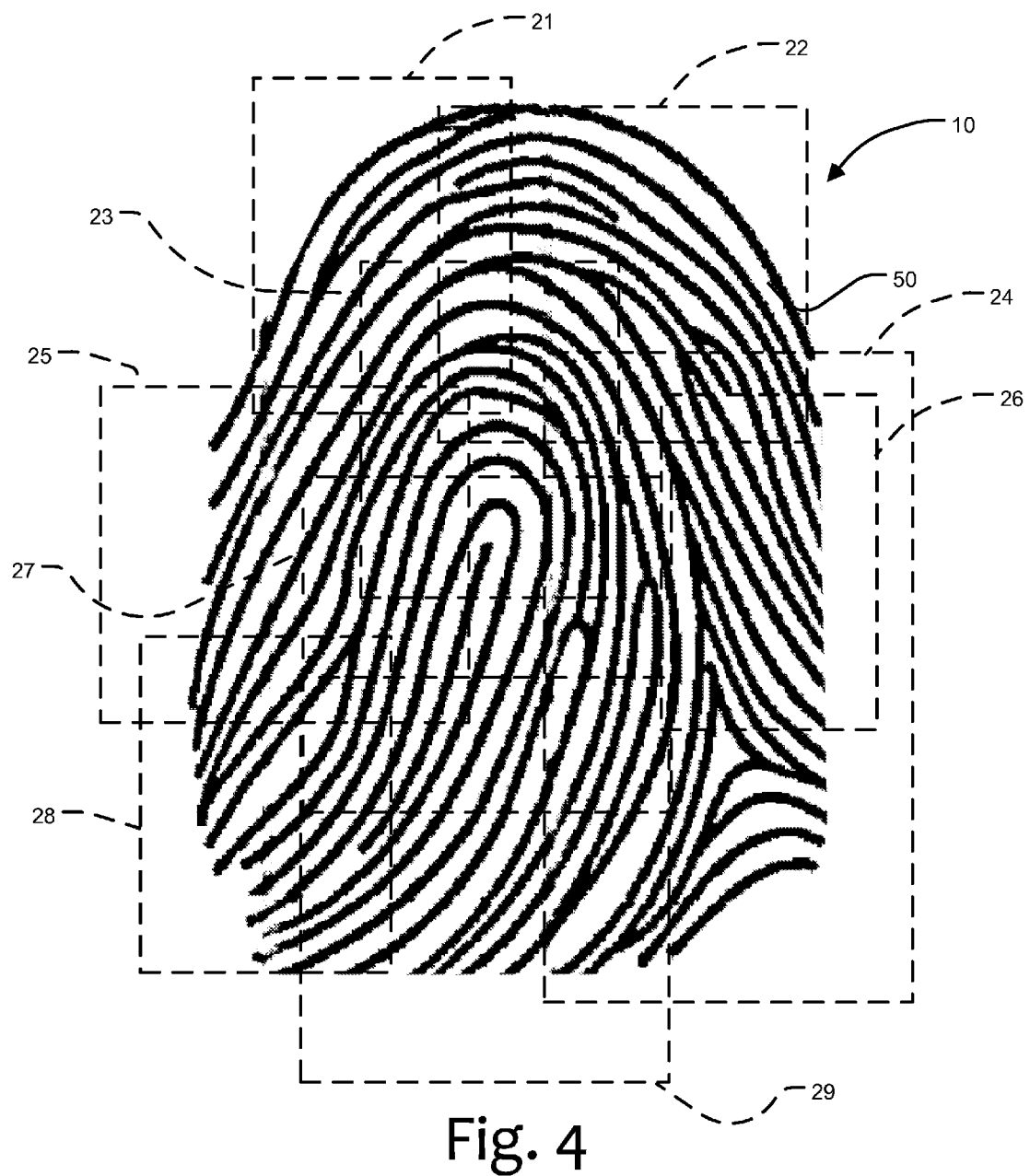
FIG. 4 illustrates a fingerprint with portions of the fingerprint captured at various times during an enrollment process.

In one configuration, as shown in FIGS. 3A-F the sensor captures a biometric data view which can be a portion of the biometric data from the user at different times during one or more user interactions with the device. The portions or views of the biometric data that are captured at one or more user settings, are compiled into a single record containing multiple fingerprint views using all or a subset of the total number of views 12, 13, 14, 15, 16 collected. In one embodiment, these views are maintained separately without any attempt to construct a fuller image. In an alternative embodiment, the views are stitched together into a fuller image. The multiple views are collected into a single record containing multiple views which together comprise a fingerprint 50 from finger 10, or can be stitched together into a fingerprint. In another illustration shown in FIG. 4, the independent pieces or views of biometric data 21, 22, 23, 24, 25, 26, 27, 28, 29 are compiled into a single record. The independent views together comprise a fingerprint 50 from finger 10.

During the authentication process, the multiple views are matched one-by-one with the information derived from the image to be authenticated. A matcher could be configured to use the multiple views to increase or decrease its estimate of the likelihood of a match. In other embodiments the matcher could treat each view as an independent entity and score the likelihood of each view independently. Then the independent scores could be combined into a single match probability.

From a user experience perspective, the systems and methods allow a biometric system, e.g. a system executed on a mobile phone or other computing platform, to perform data collection and enrollment while the user operates the phone or computing device in a normal fashion.

As an example, a fingerprint sensor can be mounted on, incorporated in, and/or integratable with the on/off "button" of a touch screen device (such as an iPad or iPhone, similar to the interface shown and described with FIG. 1D). As will be appreciated by those skilled in the art, devices can have a wide variety of form factors where, for example, an On/Off button is a separate component or is a section of, for example, a touch screen. Thus, description by way of a "button" in no way limits the operation to a physical button, but rather refers to the portion of the form factor that functions as an On/Off button enabling an end user to turn the device on or off. For this scenario, every time the end user interacts with the device to switch the device on or off, the user touches a portion of the device that functions as the on/off button which, in this scenario, results in the end user also engaging the fingerprint sensor. As a result, during those times that the end user turns the device on or off, the system can collect biometric data samples from the user and, after enough samples are collected, complete an enrollment for later use with biometric verification.

In this way, the user will be enrolled during one or more interactions without prompting, or doing any special work. While this process can be implemented with a swipe sensor (especially where such a sensor is also used for navigation), persons of skill in the art will appreciate that the system can also be used a two-dimensional (2D) placement sensor mounted on a button or other part of the device that will be touched during normal use of the phone (e.g. on/off button, home button, touch screen, etc.).

In another configuration, where the fingerprint sensor is incorporated into, for example, at least a portion of a touch screen, as shown in FIG. 1C, or the perimeter of the touch screen (e.g., under the ink mask and an area that does not normally enable a user to control operation of the device) a user's placement of their finger on or movement of their finger across the area, in the process of normal use of the device, such that the user's finger engages the touch screen and the fingerprint sensor below, can also be use sufficient to enable the sensor to collect fingerprint information necessary to begin building a user enrollment profile.

Where more than one person handles the device (e.g., turns the device on and off, holds the device, navigates the operation of the device), the system is configurable to analyze the various inputs to determine whether the fingerprints are the same or different, and the frequency of the appearance of a particular fingerprint. The device and system can then weigh the sensed fingerprint image and assess whether a particular fingerprint belongs to a primary user vs. someone who has just handled the device briefly (e.g., where the owner of the device shows the device to a friend, or the situation where a store employee handles the device during the sales process).

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least emulate a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and/or application specific integrated circuit ("ASIC") customized logic circuitry, such as a controller or microcontroller, a digital signal processor, or any other form of device that can fetch instructions, operate on pre-loaded/pre-programmed instructions, and/or follow instructions found in hard-wired or customized circuitry, to carry out logic operations that, together, perform steps of and whole processes and functionalities as described in the present disclosure.

Determining when to begin the enrollment process can vary depending on the configuration. In one configuration, the enrollment process can begin when, for example, a PIN is first created to unlock the device, or when personally identifying information is entered that signals the user has taken ownership of the device. The starting point would be when the owner of the device (not, for example, the sales associate) begins handling the device. In some configurations, the collection can begin after, for example, a welcome app or some time from initial phone activation.

Determining when the enrollment process ends can vary depending on the configuration. In one configuration, for example, ending the enrollment process can be based on identified criteria, such as a weighted combination of one or more of each of (a) a substantial area of the finger collected, (b) more than a threshold number of views collected (whether the number of the threshold is set based on factors such as desired sensitivity levels), (c) passage of a threshold amount of time since the beginning of the process, (d) when the system determines that consistent finger information is no longer being sensed (e.g., another user's finger is present).

Where the criteria is a substantial area of the finger collected, the criteria can be based on, for example, area, pixels, or any other input. For example, where area is measured, the threshold can be determined where the area is greater than 50% of an average fingerprint area, greater than 60% of an average fingerprint area; greater than 70% of an average fingerprint area; greater than 80% of an average fingerprint area; and greater than 90% of an average fingerprint area.

Where the criteria is a threshold number of views collected, a number of views can be selected, for example, one view, two views, three views, four views, five views, six views, seven views, eight views, nine views, and ten views.

In some configurations, a threshold amount of time since the beginning of the process can be used to determine when the enrollment process ends. In some configurations, the enrollment can be set to expire, for example, 5 minutes from collecting the first view; 10 minutes from collecting the first view; 20 minutes from collecting the first view; an hour from collecting the first view. Other time frames as possible, from hours to days.

In some configurations, the system can terminate the enrollment process when it determines that consistent finger information is no longer being sensed (e.g., another user's finger is present).

Figure 5:
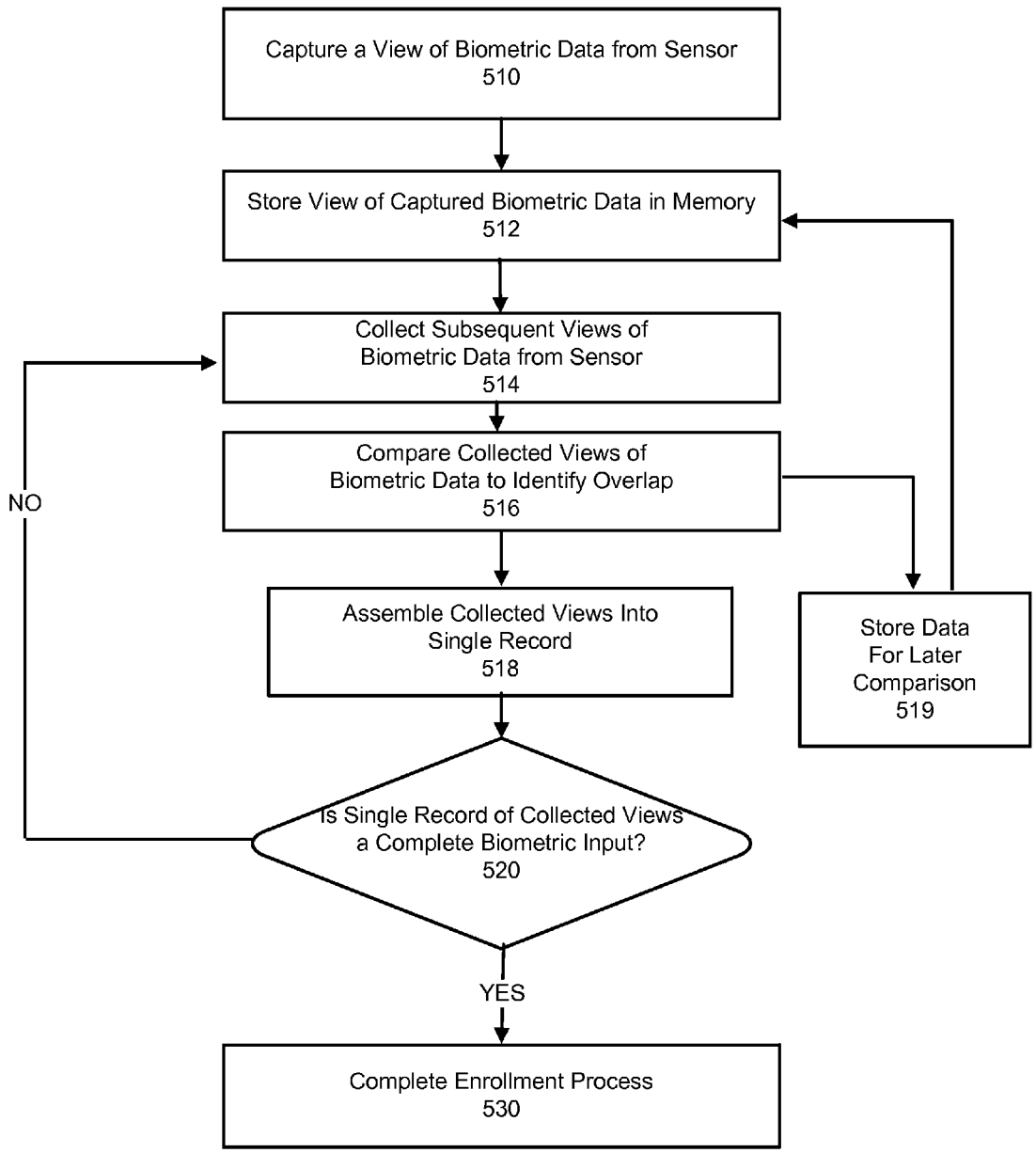
FIG. 5 illustrates in block diagram form an example of an enrollment process according to aspects of embodiments of the disclosed subject matter.

Turning now to FIG. 5, a flow chart illustrates a basic process. During the normal operation of the device and without prompting the user, the sensor captures an initial piece of biometric data from a sensor 510 at a first time. This process can begin automatically (e.g. without the user's instruction to begin the enrollment process), or semi-automatically (e.g., once the device is activated by a clerk at a store, the enrollment process is triggered by the clerk or upon a user's instruction to begin the enrollment process). The initial captured data is stored in memory 512. The initial data can be a complete fingerprint image, or a portion of a fingerprint image. The data capture is secondary to the process of using the device for normal operation (e.g., turning the device on, launching an icon, turning a page, etc.)

At a second or subsequent time, the sensor captures a subsequent portion or views of biometric data 514. The subsequent data is compared to the initial data to identify overlap 516. The subsequent portion of biometric data can completely overlap the initial data, partially overlap the initial data or not overlap the initial data. Where the subsequent data completely overlaps the initial data, or is otherwise deemed to not add additional information to the mix, the subsequent data can be deleted. Where the subsequent data partially overlaps the initial data, the initial data and subsequent data are saved for assembly in a collected view 518. Where the subsequent data does not overlap at all, the subsequent data can be stored for later incorporation into a collected view 519. The data is then analyzed to determine whether sufficient information has been captured and compiled to create a biometric input having a threshold value of completion 520. If yes, then the user is automatically or semi-automatically prompted to complete the enrollment process 530. If no, then the process of collecting subsequent subsets of data is repeated 514. As discussed above, the enrollment process can be completed by ending the enrollment process based on identified criteria, such as a weighted combination of one or more of each of (a) a substantial area of the finger collected, (b) more than a threshold number of views collected (whether the number of the threshold is set based on factors such as desired sensitivity levels), (c) passage of a threshold amount of time since the beginning of the process, (d) when the system determines that consistent finger information is no longer being sensed (e.g., another user's finger is present).

In this description, various functions, functionalities and/or operations may be described as being performed by or caused by software program code to simplify description. However, those skilled in the art will recognize what is meant by such expressions is that the functions resulting from execution of the program code/instructions are performed by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturers library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory, or external (to the microprocessor) memory such as main memory, or a disk drive, or external to the computing device, such as a remote memory, a disc farm or other mass storage device(s), etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The inter-connect may include one or more buses connected to one another through various bridges, controllers and/or adapters. In one embodiment the I/O controller may include a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instant of time.

In general, a tangible machine readable medium includes any tangible mechanism that provides (i.e., stores) information in a form accessible by a machine (i.e., a computing device), which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

In one embodiment, a user terminal can be a computing device, such as in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter may be described with reference to block diagrams and operational illustrations of methods and devices to provide a system and methods according to the disclosed subject matter. It will be understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, when executed by the computing device, e.g., on a processor within the computing device or other data processing apparatus, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented herein. Alternative embodiments are contemplated in which the order of the various functions, functionalities and operations may be altered and in which sub-operations described as being part of a larger operation may be performed independently or performed differently than illustrated or not performed at all.

Although some of the drawings may illustrate a number of operations in a particular order, functions, functionalities and/or operations which are not now known to be order dependent, or become understood to not be order dependent, may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

III. Methods of Use

An electronic device 100 configurable to position a sensor, such as a 1D sensor, a 2D sensor or a touch sensor, within sensing region is deployed by a user. The user applies and/or swipes his or her finger, or applies the element to be sensed, to a surface of the device in a position in communication with the sensor.

For example, the element to be sensed (such as a finger) can be applied (e.g., by swiping across the surface) in a position that is in communication with the sensing element. Thus, for example, the fingerprint is sensed by the fingerprint sensor and/or biometric input is received. The sensed input (such as a fingerprint) is validated. Once validated, use of the electronic device 100 is permitted or other functionality controlled by the fingerprint authentication is permitted.

As will be appreciated by those skilled in the art, once the enrollment process is completed sensors disclosed can be used in a variety of ways including, for example:

User authentication for device (e.g., phone, tablet, or computer) unlocking

User authentication for online transactions

User authentication for access to device systems and services, including websites and email Replacement of Password and PINs Physical access such as door locks Time and attendance systems (prove you were at a certain place at a certain time)

Finger-based input devices/navigation for mobile phones and gaming

Finger-based shortcuts (authentication of a given finger results in the corresponding action to which that finger is mapped)

Non-repudiation for online transactions

The disclosed subject matter is described in the present application with reference to one or more specific exemplary embodiments thereof. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A non-transitory computer readable medium storing instructions that, when executed by a computing device, cause the computing device to perform a method of compiling an initial enrollment record, comprising:

automatically obtaining a plurality of fingerprint views during an initial enrollment process without providing an indication to a user that the plurality of fingerprint views are being obtained either before or during the initial enrollment process;

creating a user authentication record containing the plurality of fingerprint views;

determining whether the user authentication record of the plurality of fingerprint views reaches a target threshold value; and concluding the method of compiling the initial enrollment record at least partially based on a threshold amount of time having passed since a beginning of the method of compiling the enrollment record and a sensing of fingerprint information from a different user from the plurality of fingerprint views.

2. The non-transitory computer readable medium of claim 1, wherein the step of automatically obtaining a plurality of fingerprint views during the initial enrollment process has a lower processing priority than normal operating functions of the computing device.

3. The non-transitory computer readable medium of claim 2, wherein normal operating functions of the computing device comprise turning the computing device on.

4. The non-transitory computer readable medium of claim 2, wherein normal operating functions of the computing device comprise launching an application.

5. The non-transitory computer readable medium of claim 1, wherein the step of concluding the method of compiling the initial enrollment record is at least partially based on a threshold number of views being collected.

6. A system comprising:
a processor configured to:
automatically obtain a plurality of fingerprint views during an initial enrollment process without providing an indication to a user that the plurality of fingerprint views are being obtained either before or during the initial enrollment process;
create a user authentication record containing the plurality of fingerprint views;
determine whether the user authentication record of the plurality of fingerprint views reaches a target threshold value; and
conclude the initial enrollment process at least partially based on a sensing of fingerprint information from a different user from the plurality of fingerprint views.

7. The system of claim 6, wherein the initial enrollment process concludes at least partially based on a threshold amount of time having passed since a beginning of the initial enrollment process.

8. The system of claim 6, wherein the processor is configured to perform the step automatically obtaining the plurality of fingerprint views during the initial enrollment process at a lower processing priority than normal operating functions of the processor.

9. The system of claim 8, wherein normal operating functions of the processor comprise turning the processor on.

10. The system of claim 8, wherein normal operating functions of the processor comprise launching an application.

11. The system of claim 6, wherein the user authentication record is created without providing an indication to the user that the user authentication record containing the plurality of fingerprint views is being created.

12. The system of claim 6, wherein the processor is associated with a device that is configured to be locked and may be unlocked upon receiving a user selected Personal Identification Number (PIN),
wherein the initial enrollment process is begun without providing an indication to the user that the initial enrollment process is being begun, and
wherein the initial enrollment process is begun when the user selected PIN is created to unlock the device.

13. The system of claim 6, wherein the initial enrollment process is begun without providing an indication to the user that the initial enrollment process is being begun, wherein the initial enrollment process is begun after a welcome app.

14. The system of claim 6, wherein the initial enrollment process is begun without providing an indication to the user that the initial enrollment process is being begun, wherein the initial enrollment process is begun and the plurality of fingerprint views are obtained at a pre-determined time after initial activation of a device associated with the processor.

15. The system of claim 6, wherein concluding the method of compiling the initial enrollment record is further at least partially based on a weighted combination of one or more of: a target amount of an area of a fingerprint being collected, a threshold number of views being collected, and a threshold amount of time having passed since a beginning of the method of compiling the initial enrollment record.

16. A method of compiling an initial enrollment record, the method comprising:
automatically obtaining a plurality of fingerprint views during an initial enrollment process without providing an indication to a user that the plurality of fingerprint views are being obtained either before or during the initial enrollment process;
creating a user authentication record containing the plurality of fingerprint views;
determining whether the user authentication record of the plurality of fingerprint views reaches a target threshold value; and
concluding the compiling of the initial enrollment record upon identified criteria.

17. The method of claim 16, wherein the identified criteria includes a target amount of an area of a fingerprint is collected.

18. The method of claim 16, wherein the identified criteria includes a threshold number of views are collected.

19. The method of claim 16, wherein the identified criteria includes a threshold amount of time has passed.

20. The method of claim 16, wherein the identified criteria includes consistent fingerprint information is no longer sensed.

* * * * *